March 9, 1965  C. W. STEWART  3,172,288
ANTIFRICTION DRIVE STUD FOR A GAS METER VALVE
Filed Aug. 23, 1962  3 Sheets-Sheet 1

INVENTOR.
CHARLES W. STEWART
BY
MAHONEY, MILLER & RAMBO
BY W. H. Rambo
ATTORNEYS

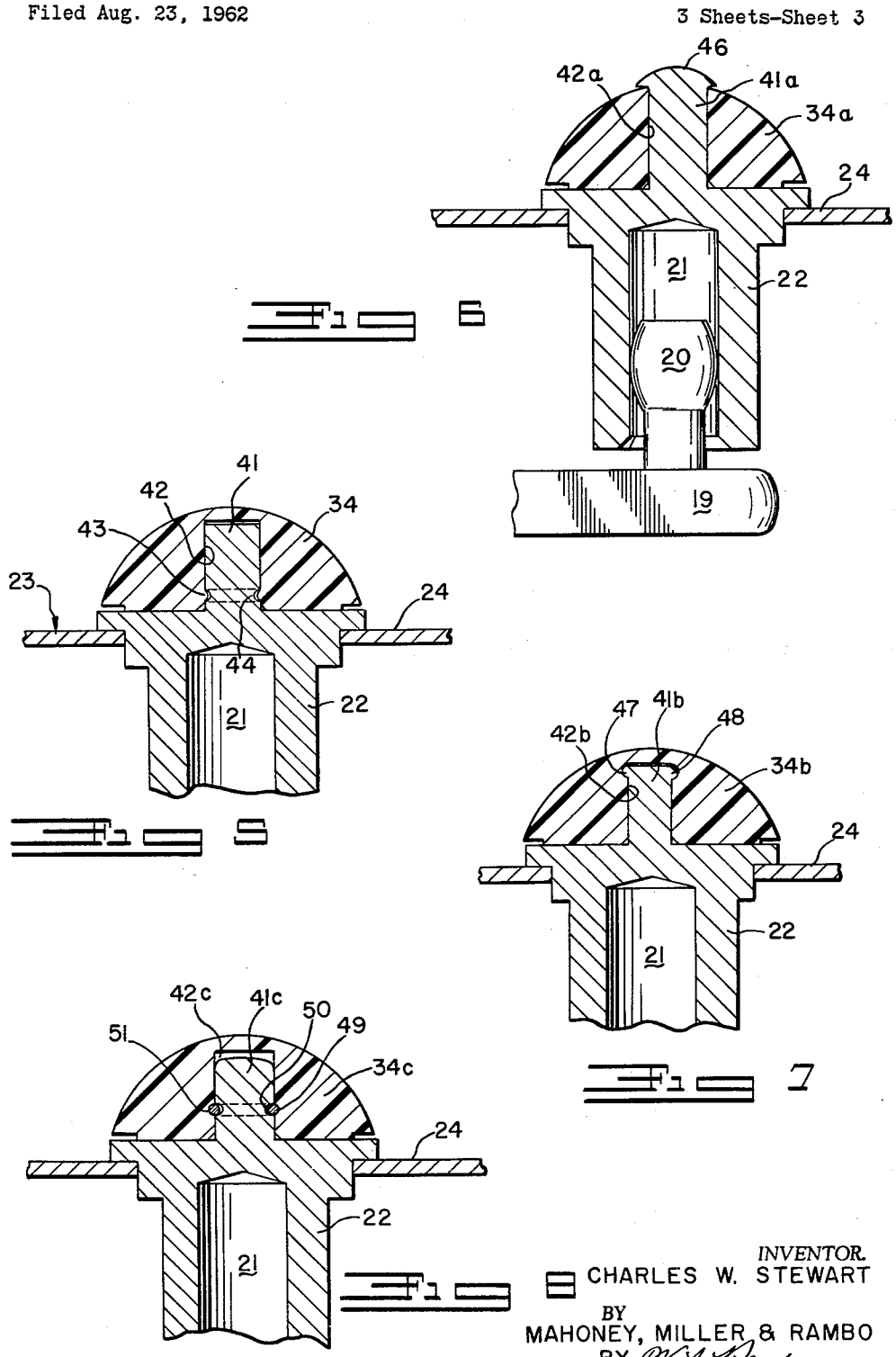

United States Patent Office 3,172,288
Patented Mar. 9, 1965

3,172,288
ANTIFRICTION DRIVE STUD FOR A GAS
METER VALVE
Charles W. Stewart, Lancaster, Ohio, assignor to
Karl L. Schaus, Tempe, Ariz.
Filed Aug. 23, 1962, Ser. No. 219,034
5 Claims. (Cl. 73—272)

This invention relates generally to gas meters of the type in which a plurality of diaphragms actuated by gas pressure produce a reciprocating motion for operating a valve mechanism and the valve mechanism, in turn, drives an index mechanism for indicating the volume of gas which flows through the meter. More specifically, the present invention deals with an improved antifriction drive connection between the valve mechanism and the index mechanism of a gas meter.

A well-known type of gas meter widely utilized in commercial fuel gas distribution systems includes a housing provided with a pair of pulsating diaphragm members which form a plurality of relatively separated, internal chambers within the meter housing. A valve mechanism, including an orbital valve plate sequentially controls the flow of gas to and from the chambers of the meter. The diaphragms are reciprocated by gas pressure and are operatively connected through a suitable motion-transmitting linkage to the valve plate so as to cause the plate to orbit in a circular path and to alternately open and close the passages leading to and from the diaphragm chambers of the meter. A flow-indicating index mechanism is operatively connected to be driven by the valve plate, so as to record the movement thereof which is proportional to the volume of gas flowing through the meter. In gas meters of this type, the driving connection between the orbital valve plate and the index mechanism includes an outwardly projecting crank stud fixed to the center of the valve plate for orbiting movement therewith. The crank stud engages a crank arm of the index drive assembly to impart a rotative motion thereto. The crank stud is of generally hemispherical shape and is formed integral with or otherwise rigidly secured to the valve plate. Both the crank arm and the crank stud are usually fabricated from a metal alloy, such as brass, which has a specific coefficient of friction. As the valve plate moves in its circular orbit, the crank stud also moves in a circular orbit around the axis of the crank arm and is maintained in engagement with the crank arm causing the latter to rotate. The valve plate does not normally rotate about its central axis, but moves bodily in a circular orbit about the axis of rotation of an associated eccentric crank support to which the valve is connected. Thus, a sliding contact is maintained between the crank stud and the crank arm which produces friction and consequent wear upon these parts. Additionally, when the crank stud and crank arm become sufficiently worn, these parts tend to bind and cause the valve plate to tilt or cock at an angle with respect to its associated valve seat, thus causing undesired leakage of gas from one chamber to another with resultant inaccuracy of meter indication. Another factor tending to increase the frictional force between the crank stud and the crank arm of the index mechanism results from the construction of the meter itself. While a meter is theoretically constructed and assembled so as to align the axis of rotation of the crank arm with the center of orbit of the valve plate, this is seldom possible as a practical matter, due to the close tolerances involved. As a result, the crank stud will also slide longitudinally on the crank arm, thus further increasing the frictional forces between these parts.

It is, therefore, the primary object of this invention to provide an improved antifriction drive connection between the orbital valve plate and the index drive crank arm of a gas meter.

It is another object of this invention to provide a crank stud which is mounted for independent axial rotation on its associated orbital valve plate, to thus eliminate relative rotation and consequent friction between the crank stud and the relatively engaging crank arm of the index drive mechanism of the gas meter.

It is a further object of this invention to provide a valve plate crank stud which may readily be fabricated from a self-lubricating material having a relatively low coefficient of friction.

It is also an object of this invention to provide a valve plate for a meter of this type having a rotatably mounted crank stud that may be economically fabricated as a replacement part for previously installed meters.

These and other objects and advantages of this invention will be readily apparent from the following detailed description and the accompanying drawings.

In the drawings:

FIG. 5 is a detailed vertical sectional view of a preferred form of antifriction crank stud embodying the present invention; and FIGS. 6, 7 and 8 are similar views showing three modified species of crank studs formed in accordance with the present invention.

Figure 1:
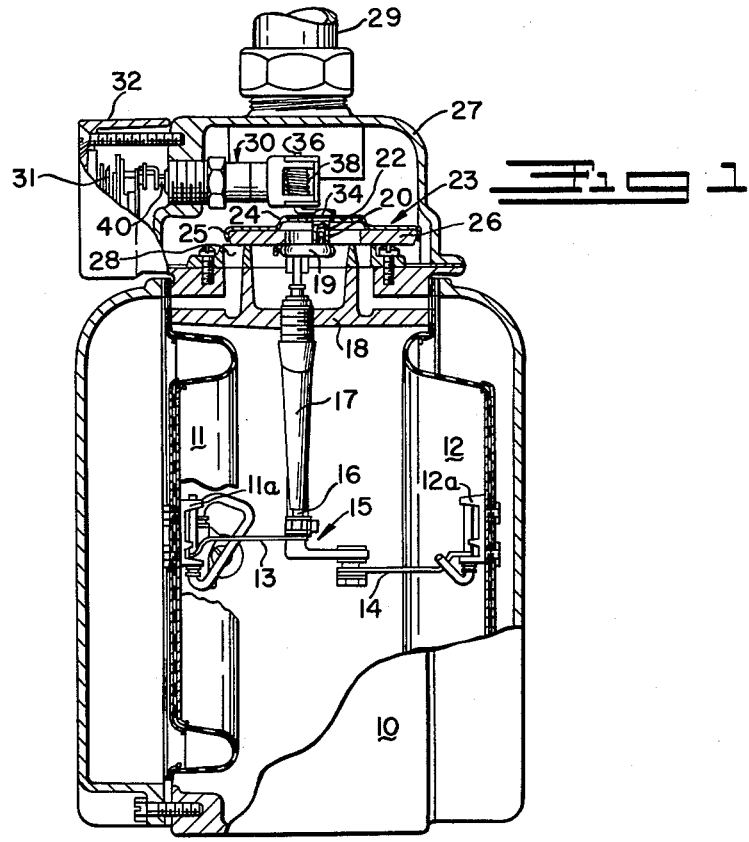
FIG. 1 is a medial, transverse vertical sectional view of a gas meter embodying a valve plate and associated index-driving crank stud formed in accordance with the present invention.

FIG. 1 of the drawings illustrates, substantially in its entirety, a standard and well-known type of gas meter to which the present invention is applicable. The meter includes a lower, sectional diaphragm housing or casing 10 in which is mounted a pair of relatively spaced, pulsating or reciprocating diaphragm assemblies 11 and 12. The central portions of the diaphragms 11 and 12 are provided with support brackets 11a and 12a which are pivotally connected with the oppositely projecting arms 13 and 14 of a conventional, tangent-type crank linkage 15. The crank linkage 15 is connected in the usual manner to impart axial rotation to a vertically arranged shaft 16 upon unified reciprocating movement of the diaphragms 11 and 12. The shaft 16 is journalled for rotation within a tubular bearing 17 which is supported by and depends from a stationary cross wall 18 of the meter casing 10. The upper end of the drive shaft 16 projects outwardly above the bearing 17 and is provided with a crank arm 19 which includes a bearing stud 20 disposed in eccentric, offset relation to the axis of the shaft 16. The bearing stud 20 of the crank arm 19 extends into and is rotatable within a downwardly opening, axial bore 21 formed in a bushing 22 secured to the central portion of a circular valve plate assembly 23. The valve plate assembly includes a circular, dome-shaped sheet metal frame 24 having a down-turned marginal edge portion 25 in which is secured the peripheral edge of an annular valve plate 26 formed from glass or other suitable material.

As seen in FIG. 1, the valve plate assembly 23 is arranged within an upper valve casing 27 of the gas meter with the annular valve plate 26 disposed in wiping contact with a suitably ported, stationary valve seat 28. As will be readily understood by anyone familiar with gas meters of this type, the valve plate assembly 23 is arranged for bodily orbital movement in a horizontal plane about a center defined by the axis of the shaft 16, and during such movement, functions to control sequentially the flow of gas from an inlet or supply conduit 29 through the diaphragm chambers of the meter and thence outwardly from the meter by way of an outlet conduit, not shown. The desired orbital movement of the valve plate assembly is, of course, derived from the pulsating or reciprocating movement of the diaphragms 11 and 12 in response to the presence of the gas passing through the meter.

As will be hereinafter more fully explained, the orbiting movement of the valve plate assembly 23 is translated through an index drive assembly, indicated generally at 30, to a plurality of visual indicator dials 31 contained within a windowed dial housing or casing 32 which is secured to the front side of the valve casing 27. The indicator dials 31 are driven through a suitable gear train, not shown, and are calibrated and graduated so as to visually record the volumetric flow of gas through the meter.

It should here be understood that the various parts or components of the meter, as heretofore described, are well known and are commonly used in present day gas meters. As such, they form no part of the present invention, but are illustrated and described only for the purpose of lending background to the present invention.

Figure 2:
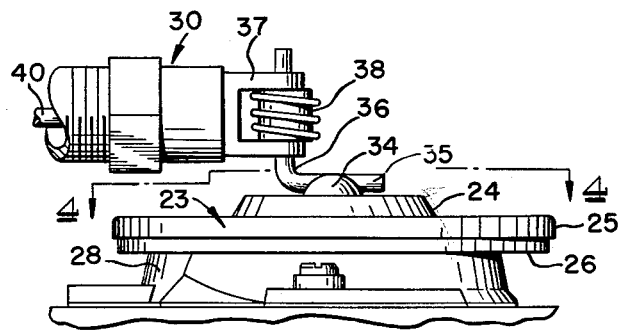
FIG. 2 is an enlarged fragmentary side elevational view of the present crank stud and a portion of the index mechanism of a gas meter.
Figure 3:
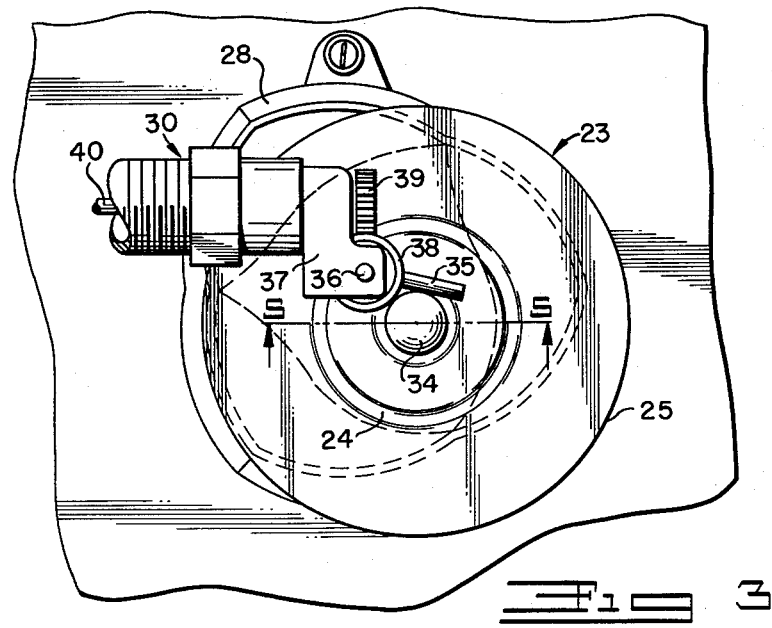
FIG. 3 is a fragmentary top plan view looking downwardly upon the index drive mechanism and valve plate shown in FIG. 2.
Figure 4:
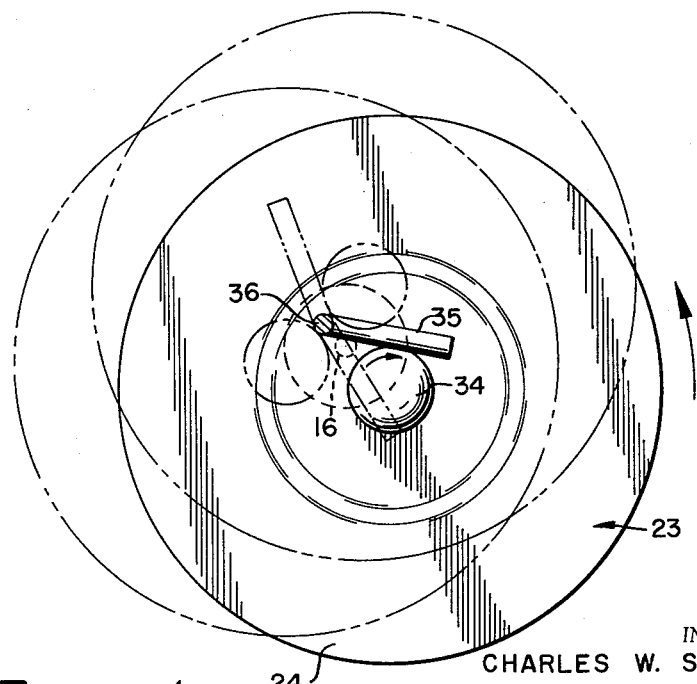
FIG. 4 is a horizontal sectional view taken along line 4—4 of FIG. 2 showing diagrammatically the movement of the valve plate, the crank stud, and crank arm of the index drive mechanism.

In accordance with the present invention, I provide an improved antifriction-type crank stud or roller 34 which is arranged for orbital movement in a horizontal plane with the valve plate assembly 23, but which is axially rotatable relative to the valve plate assembly. The roller or stud 34 thus provides a detachable driving connection between the valve plate assembly 23 and the index drive assembly 30 of the meter. As best seen in FIGS. 2–4 of the drawings, the crank stud or roller 34 is of generally hemispherical shape and projects upwardly from the center of the valve plate assembly 23 for abutting engagement with the horizontal arm 35 of the crank shaft 36 of the index drive assembly 30. The crank shaft 36 is journalled for rotation within a bifurcated frame extension 37 carried in laterally offset relation to the longitudinal axis of the index drive assembly 30. Keyed to the crank shaft 36, between the bifurcated frame 37, is a worm 38 disposed in meshing engagement with the teeth of a worm wheel or gear 39 secured to the inner end of the index drive shaft 40 of the index drive assembly 30.

Referring to FIG. 5, the crank stud 34 is preferably molded from a suitable synthetic resin having a comparatively low coefficient of friction, and is rotatably carried on an axle pin 41 formed as an integral, vertical extension of the bushing 22 of the valve plate assembly 23. Toward this end, the crank stud 34 is formed with an axially disposed bore or socket 42 which loosely fits over the axle pin 41. The wall of the bore 42 is formed toward the lower end thereof with an annular retaining rib 43 which is adapted to engage an annular recess 44 formed in the periphery of the axle pin 41, when the crank stud is pressed downwardly over the axle pin. In this manner, the crank stud 34 is rotatably held on the axle pin 41 against accidental vertical removal. As best seen from FIGS. 3 and 4 of the drawings, the valve plate assembly 23 and the crank stud 34 are arranged for orbital movement in a counterclockwise direction about a center defined by the axis of the shaft 16. As the stud 34 orbits in its circular path, it engages the horizontal arm 35 of the crankshaft 36 and imparts axial rotation to the latter. While the meter is designed with the intention that the crankshaft 36 of the index drive assembly be disposed in axial alignment with the diaphragm-driven shaft 16, such a relationship is practically impossible to achieve, due to variations in assembly of the parts, dimensional tolerances, etc. Thus, in most cases, the axis of rotation of the crankshaft 36 is slightly laterally offset from the axis of rotation of the shaft 16 and the center of orbit of the valve assembly 23. This relative offset of the shafts 16 and 36 causes the stud 34 to move a limited distance radially inwardly and outwardly with respect to the axis of rotation of the crankshaft 36 during orbiting movement of the stud 34 about the axis of the shaft 16. This, in turn, results in relative linear movement of the stud 34 on the arm 35. Such movement is illustrated diagrammatically by broken lines in FIG. 4. Thus, it will be seen that as the stud 34 moves in its counterclockwise circular orbit around the axis of the shaft 16, the crankshaft 36 is rotated through abutting engagement of the stud 34 with the arm 35. Concurrently with bodily orbiting movement, the stud rolls a limited distance back and forth on the arm 35. The relative rolling movement of the stud 34 on the arm 35 greatly reduces the wear on these parts which would otherwise result were the stud 34 not free to rotate on the pin 41, as is the case with prior art meters of this type.

FIG. 6 of the drawings illustrates a slightly modified form of rotatable crank stud assembly, wherein the crank stud or roller 34a possesses substantially the same shape as the preferred form of stud 34, but is formed with an axial bore 42a which extends completely through the stud body, and is rotatably mounted on a vertical pin 41a having a swaged or riveted retaining head 46.

FIG. 7 illustrates another modified crank stud assembly, wherein the hemispherical crank stud or roller 34b is formed with a pin-receiving socket 42b having a relatively diametrically enlarged inner end portion 47, and which is adapted to be resiliently snap-fitted over the relatively enlarged head portion 48 of the bushing pin 41b. The stud 34b is formed from a synthetic resin having sufficient resiliency to permit the socket 42b to expand slightly when the stud is pressed downwardly over the headed pin 41b. At the same time, the diameter of the socket 42b is such as to permit the stud 34b to rotate freely on the pin 41b when in the assembled position as shown in FIG. 7.

Still another modified form of crank stud assembly is shown in FIG. 8. In this latter form, the crank stud or roller 34c is rotatably secured upon the upwardly projecting bushing pin 41c by means of a resilient split ring 49 which is partially seated within an annular groove 50 formed in the periphery of the pin 41c and which extends into a cooperative annular groove 51 formed in the wall of the bore or socket 42c of the stud 34c. In this instance, the stud 34c is assembled on the pin 41c first by placing the split ring 49 in the groove 50 of the pin and thereafter forcibly pressing the socket of the stud onto the pin and over the ring 49 until the ring snaps outwardly into the groove 50 of the socket 42c. In this position, the stud 34c is rotatably secured to the pin 41c against accidental vertical displacement.

In view of the foregoing, it will be seen that the present invention provides an improved rotatable, antifriction crank stud assembly for drivingly, yet detachably, connecting the diaphragm-driven valve plate assembly of a gas meter with the index drive assembly thereof. Crank stud assemblies formed in accordance with the present invention may be quickly and easily installed in standard-type meters without extensive structural modification to existing parts, simply through a replacement of the existing crank stud and valve plate bushing components. When so installed, the present crank studs substantially eliminate frictional wear between the stud and the associated crank shaft of the index drive mechanism of the meter, and thereby increase the efficiency and operating life of the meter.

While certain preferred embodiments of the invention have been illustrated and described in detail, it will be understood that various modifications as to details of construction and design may be resorted to without departing from the spirit of the invention or the scope of the following claims.

Having thus described this invention, what is claimed is:

1. In a gas meter of the type comprising a diaphragm-driven valve plate assembly arranged for orbital movement in a circular path and in a substantially horizontal plane, and an index drive assembly having a rotatable crank arm arranged immediately above said valve plate assembly for rotation in a substantially horizontal plane about an axis disposed substantially in alignment with the center of orbit of said valve plate assembly; that improvement which comprises a roller stud rotatably carried by and projecting upwardly from said valve plate assembly and rollingly engaged with the crank arm of said index drive assembly for imparting rotation thereto upon orbital movement of said valve plate assembly.

2. Apparatus as defined in claim 1, wherein said roller stud is of generally hemispherical shape and is formed from a solid synthetic resin having a low coefficient of friction.

3. In a gas meter of the type including an index drive assembly having a dependent crank arm arranged for rotation in a substantially horizontal plane; a circular valve plate assembly arranged below said crank arm for movement in a circular orbit in a substantially horizontal plane; a generally vertically arranged axle pin carried by and projecting upwardly from said valve plate assembly into the plane of movement of said crank arm; and a roller stud rotatably mounted on said axle pin and rollingly engageable with said crank arm for imparting rotation thereto upon orbital movement of said valve plate assembly.

4. A gas meter as defined in claim 3, wherein said roller stud is of hemispherical shape and is formed from a solid synthetic resin having a low coefficient of friction.

5. A gas meter as defined in claim 3, wherein said roller stud is readily detachable from said axle pin.

References Cited by the Examiner
UNITED STATES PATENTS

| | | | |
|---|---|---|---|
| 2,765,657 | 10/56 | Gilmore | 73—272 |
| 3,062,572 | 11/62 | Flumerfelt | 287—90 |

RICHARD C. QUEISSER, *Primary Examiner.*